UNITED STATES PATENT OFFICE.

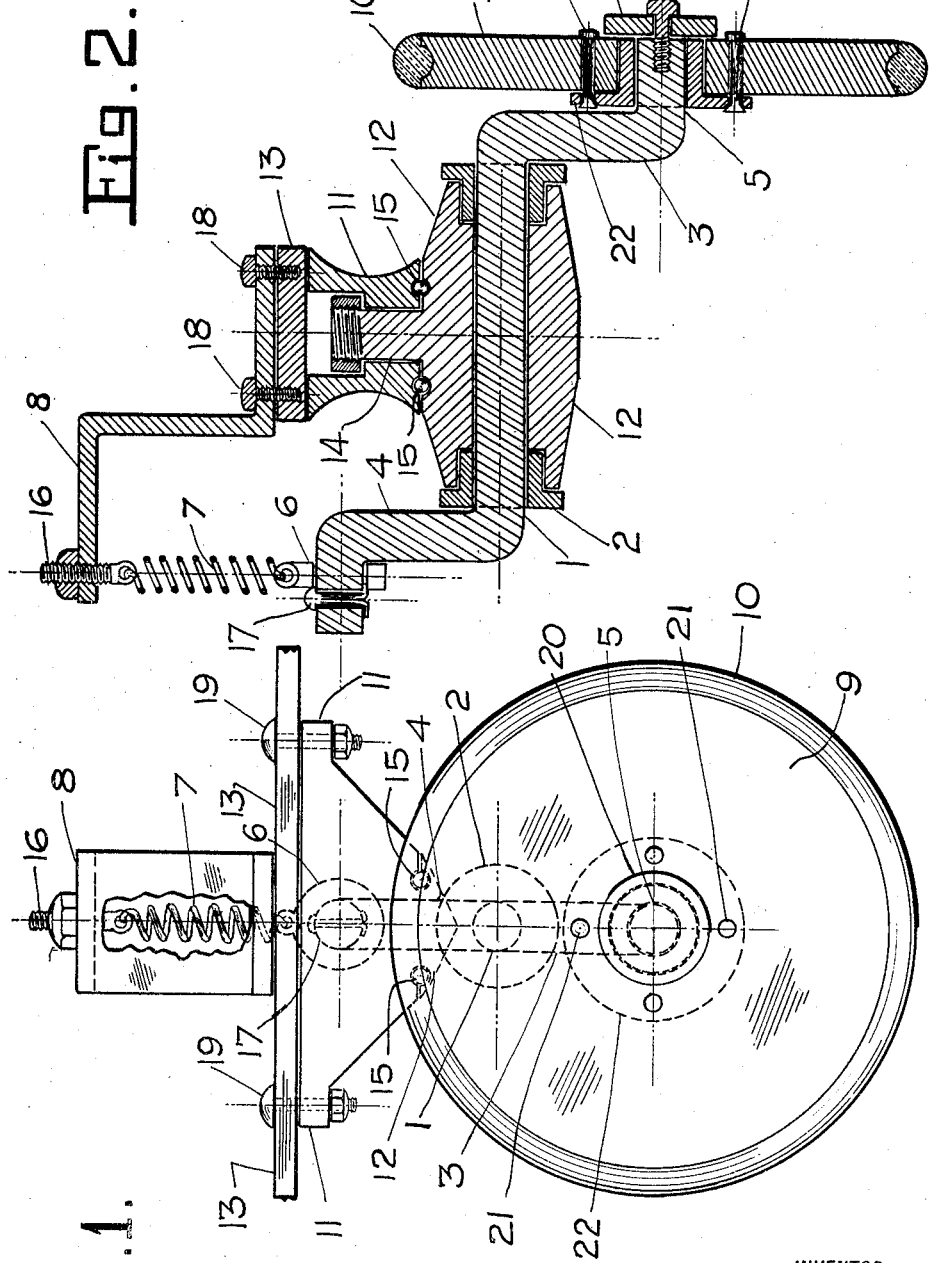

EDWIN J. GOULD, OF FRUITVALE, CALIFORNIA.

SHOCK-ABSORBING WHEEL.

1,343,774.    Specification of Letters Patent.    Patented June 15, 1920.

Application filed November 27, 1918. Serial No. 264,445.

*To all whom it may concern:*

Be it known that I, EDWIN J. GOULD, a citizen of the United States, residing at Fruitvale, county of Alameda, State of California, have invented certain new and useful Improvements in Shock-Absorbing Wheels, whereof the following is a specification.

This invention relates to certain new and useful improvements in vehicle wheels of similar action to the wheel set forth in Letters Patent Number 1,250,447 issued December 18, 1917 to the under-signed applicant, and has for its object a similar purpose to primarily provide a wheel which will absorb road shocks.

It has for a further object to provide a simple and efficient construction embodying a shaft with a crank on each end, on one of which cranks the wheel is mounted, while the other crank is controlled by a spring, the expansion of which allows the wheel to oscillate as obstructions are met.

The device is simple in the extreme, yet most reliable and efficient in its operation, not liable to injury and in practice has been found to be exceedingly durable.

Other objects and advantages of the invention will hereinafter appear and the novel features thereof will be particularly pointed out in the appended claims.

The invention is clearly illustrated in the accompanying drawings, which, with the numerals of reference marked thereon form a part of the specification, and in which Figure 1 is a side elevation illustrating my invention.

Fig. 2 is a substantially central vertical section through the same. Like numerals refer to like parts in both views.

Referring to the drawing, 1 designates the shaft or axle, and 2 bronze bearings thereon. 3 is a crank extension of axle which makes a downward and also an outward right-angle turn before entering hub of wheel. 4 is an opposite continuation of axle 1 with two right-angle turns, one projecting upward, and the other outward, the last of which passes through bearing 6 which in the present instance is shown with its upper part terminating in an eye through which eye is passed the hook on lower end of spring 7. 7 is a spring, shown in the present instance as an expanding coil spring fastened at one end to strap iron support 8 by means of an eyebolt 16, all as seen clearly in Fig. 2. 9 is the wheel, which is here shown as a solid disk, and 10 is the tire on wheel. 11 is supporting bracket between the bearing and the frame 13, and 14 is a threaded pin solid with the boxing 12 and extending upward into a hole in the bracket 11 where it can be turned in either direction as a steering knuckle, and 15 is a thrust ball bearing between bracket 11 and boxing 12 to give support, and facilitate easy turning. 17 is a cotter pin through the crank 4. 18 are screw bolts holding strap iron 8 to frame 13. 19 are bolts securing bracket 11 to frame 13. 20 is a washer holding wheel on spindle; 21 are rivets securing bronze bearings 22 to the wheel.

The axle 1 can rotate in its bearings 2, but each revolution would involve extension of spring 7 to its full dimension as the spring 7 acting by its tension on crank 4 tends to hold crank 4 in position shown in normal running, in which action axle 1 does not move in its bearing 2. Crank 3, and wheel 9 are held in the relative position shown by the spring tension but when obstructions are met by wheel the shock moves crank 3 which rotates, or rather, oscillates shaft 1 and moves crank 4 in an opposite direction to that of crank 3 and expands spring 7, the spring causing wheel to regain normal position as obstruction is passed. In other words it is a solid double crank with the cranks standing opposite each other. Thus the axle 1 is normally held above the center of the wheel and as the wheel strikes an obstruction and the lower crank 3 is moved in a vertical plane backward and upward the whole of the wheel is moved with it over the obstruction without in any way affecting the rotation of the wheel itself as regards its action with the ground.

When the obstruction has been passed the reverse action takes place and the old positions of cranks are resumed, and as the cranks can freely oscillate both forward and backward there is no severe action as is the case with an up and down spring with no means to change its direction.

What is claimed as new is:—

1. A shock absorbing wheel comprising an axle with a crank rigid with it and ending with a wheel spindle, and a second crank at an angle thereto having its end terminating in a combined bearing and eye.

2. A shock absorbing wheel comprising an axle with rigid crank, a second crank rigid with first named crank, and at an angle thereto, a combined bearing and eye for the second named crank, and a spring acting on said eye.

3. In a shock absorbing wheel an axle in suitable bearing, a crank rigid on each end of said axle, a wheel spindle on end of one crank, a combined bearing and eye on end of second crank.

4. In a shock absorbing wheel, an axle, a crank rigid thereto, a second crank rigid to first named crank and at an angle thereto, a combined bearing and an eye on last named crank, and a spring connecting the same with a relatively fixed part.

5. In a shock absorbing wheel, an axle having one more bearing than the wheel bearing and a suitable boxing thereon, an upright pin rigid with said boxing, thrust bearing on said boxing, a securing nut on said pin and the whole adapted to have a hinge or knuckle movement for steering.

In testimony that I claim the foregoing I have hereunto set my hand in the presence of two witnesses.

EDWIN J. GOULD.

Witnesses:
   CORA HUGHES,
   E. K. WATERMAN.